United States Patent [19]

Gillespie

[11] 3,773,567

[45] Nov. 20, 1973

[54] DIFFUSED HETEROJUNCTION MULTILAYER COATINGS FOR ELECTROSTATIC PHOTOGRAPHY

[75] Inventor: Frank C. Gillespie, Findon, South Australia, Australia

[73] Assignee: The Commonwealth of Australia care of The Secretary, Department of Supply, Parkes, Canberra, Australian Capital Territory, Australia

[22] Filed: Dec. 30, 1969

[21] Appl. No.: 889,136

[30] Foreign Application Priority Data

Dec. 30, 1968 Australia .......................... 48483/68

[52] U.S. Cl. .................... 148/1.5, 148/186, 148/174

[51] Int. Cl. ............................ H01l 7/00, H01l 7/44

[58] Field of Search .................... 148/174, 175, 188, 148/189, 186, 1.5; 136/89

[56] References Cited

UNITED STATES PATENTS

| | | | |
|---|---|---|---|
| 3,082,283 | 3/1963 | Anderson | 136/89 |
| 3,208,888 | 9/1965 | Ziegler | 148/174 |
| 3,366,517 | 1/1968 | Hwa N. Yu | 148/175 |
| 3,376,163 | 4/1968 | Abrahamsohn | 136/89 |
| 3,391,017 | 7/1968 | Bolger | 148/174 |
| 3,460,240 | 8/1969 | Tarneja | 136/89 |
| 3,582,410 | 6/1971 | Chapelle | 148/186 |
| 3,192,083 | 1/1965 | Sirtl | 148/174 |
| 3,303,070 | 2/1967 | Schmidt | 148/187 |
| 3,368,125 | 2/1968 | Pasierb | 148/175 |
| 3,440,113 | 4/1969 | Wolley | 148/189 |
| 3,441,453 | 4/1969 | Conrad | 148/189 |
| 3,510,715 | 5/1970 | Lehmann | 148/174 |

OTHER PUBLICATIONS

"Semiconductor Heterojunctions" by Longini et al., Published March 1965, Transactions Metallurgical Society AIME Volume 223, pages 444–449.

*Primary Examiner*—Hyland Bizot
*Attorney*—Waters, Roditi, Schwartz & Nissen

[57] ABSTRACT

A method of coating surfaces for electrostatic photography which consists in successively depositing dissimilar materials on to a surface under conditions such that partial diffusion of one material into the adjacent material occurs at the interface between the dissimilar materials to an extent such that zones of p-type and n-type semiconductors are produced in the diffused region which act together as rectifying junctions to allow control of holes and electrons produced by photons which enter such an area, the first layer preferably being a conductor or semiconductor and the second layer being a photoconductor or an insulator with some injected charge mobility.

7 Claims, 4 Drawing Figures

Patented Nov. 20, 1973 3,773,567

2 Sheets-Sheet 1

DIFFUSED HETEROJUNCTION MULTILAYER COATINGS FOR ELECTROSTATIC PHOTOGRAPHY

Figure 1:
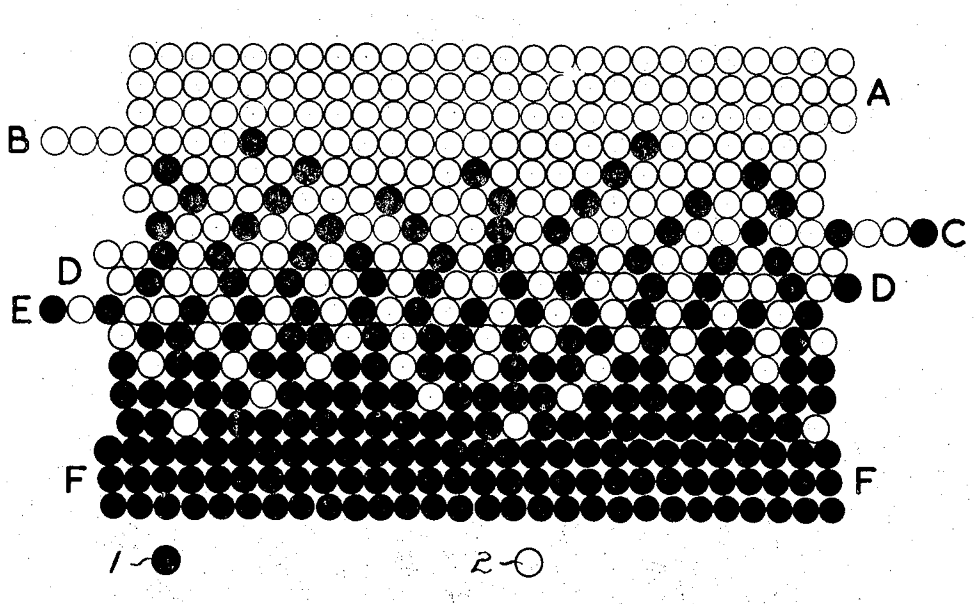

This invention relates generally to the production of electrostatic images on multilayer coatings which have rectifying junctions between layers. More particularly, but not exclusively, it relates to methods of control over the photoelectric properties of said coatings.

In the art of forming electrostatic images on surfaces an initially uniform charge may be preferentially discharged in areas exposed to some form of radiation, or a charge may be applied imagewise to the surface. Such electrostatic images can be rendered visible by bringing the surface into contact with a suitable dispersion of pigment.

Typical surfaces may consist of one or more layers coated on a supporting base material. Such coatings may be produced by vacuum evaporation of selenium on to aluminum or conductive glass. Another process suggests that improved properties are obtained by vacuum evaporation of cadmium selenide (CdSe) or antimony selenide ($Sb_2Se_3$) on to the aluminum support prior to the deposition of the selenium. Another process suggests that the support should first be coated with an insulating layer, then with a semiconductive material with a band gap of about 1.7 eV, and finally with a semiconductive material with a band gap of about 2.3 eV.

Such coatings are useful for many applications but they are restricted in spectral response to wavelengths shorter than about 650 nanometers, and they have limited response to X-rays. They also have undesirable properties, such as progressive crystallization of the selenium layer, cumulative memory effects when used and re-used for a series of images, rapid loss of charge in the dark, and lateral drift of charge in the latent image.

Accordingly it is one object of this invention to provide improved multilayer coatings with any desired spectral response, even extending into the far infra-red region.

Another object of this invention is to provide multilayer coatings with improved sensitivity to X-rays, and also sensitivity to gamma rays.

Another object of this invention is to provide multilayer coatings with improved dark retention of electrostatic charges, and with no lateral drift of charge in the latent image.

A further object of this invention is the control of memory effect, either increasing this effect so that a latent image is retained for long periods, or eliminating the memory effect altogether.

Yet another object of this invention is to provide improved surfaces for the formation and retention of charge patterns produced by exposure to high energy particulate radiations.

The present invention attains the foregoing objects by the deposition of layers of selected materials on a selected support in a specified sequence under such conditions that partial diffusion of one material into another occurs at one or more interfaces, whereby zones of p-type and n-type semiconductors are produced which act together as rectifying junctions.

Figure 2:
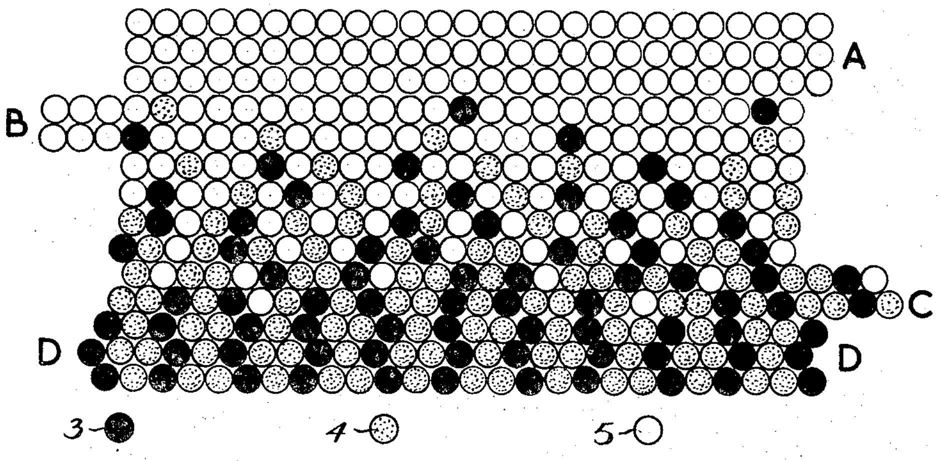
Figure 3:
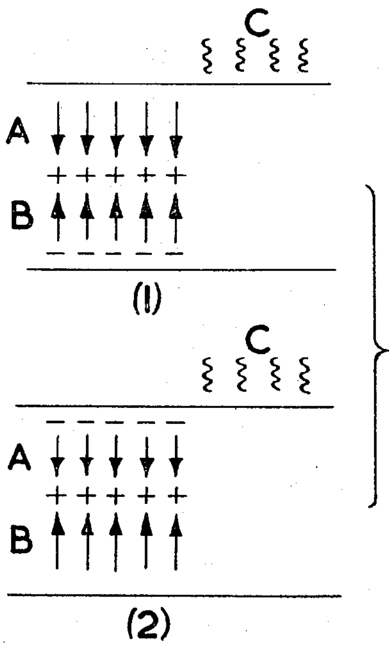
Figure 4:
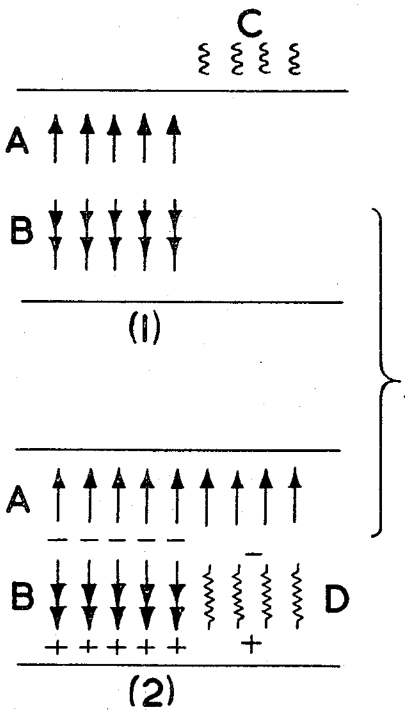

The improved methods and additional advantages of this invention are included in the detailed description which follows. This description is accurate with regard to practical details, but the applicant does not wish to be bound by theoretical considerations included in the description. The description will be made with reference to the accompanying drawings in which:

FIG. 1 shows a diffused heterojunction between two elements, typified by a gold selenium junction, the gold being indicated by 1 and the selenium 2, FIG. 2 shows a diffused heterojunction between an element and a compound, typified by a bismuth telluride-selenium junction, the bismuth being indicated by 3, the tellurium by 4 and the selenium by 5, FIG. 3 shows the location of charges and the effect of irradiation in a simple diffused heterojunction layer, and FIG. 4 illustrates a persistent effect due to irradiation in another type of diffused heterojunction.

The supporting base materials which may be metals, plastics, inorganic polymers and so on, are selected for their mechanical and physical properties according to the end results desired. Insulating materials may in some instances require a coating of a suitable conductive or semiconductive substance. Generally the support is in sheet form, and has a reasonably smooth surface which must be free of dirt, grease and other contamination.

The first material applied to the support is usually a semiconductor, chosen on the basis of its photoelectric properties, and in some instances it is necessary or desirable to apply this layer in such a manner that diffusion of material occurs at the coating - support interface, so that a zone of p-type or n-type semiconductor is produced in the diffusion region. Alternatively, a conductor may be chosen for this layer on the basis of its capacity to form rectifying contacts with subsequently applied materials. In cases where no photosensitivity is required, this layer may be omitted altogether.

The final material applied over the first layer is usually a photoconductor, but may be an insulator with some injected charge carrier mobility. The material for this layer is chosen for its capacity to form p-type and n-type semiconductors when mixed in various proportions with the underlying layer, and it is always applied in such a manner that diffusion of material occurs at the interface with the underlying layer. The thickness of the final layer is usually made less than 1 micron, so that the electrical and optical properties of this layer do not greatly influence the behaviour of the system.

The essential feature of the present invention is the production of rectifying junctions at the interfaces between successive layers by ensuring diffusion of a portion of each selected layer into the other, to a depth of approximately 100 nanometers. The degree of diffusion is controlled by the conditions maintained during layer deposition, in particular by the temperature of the support. This feature is best explained by considering two simple cases.

In the system illustrated in FIG. 1, using a glass support, having first gold and then selenium vacuum evaporated on to the support at room temperature, diffusion occurs at the gold-selenium interface. This is caused by localised temperature rise at the surface due to the release of latent heat as the selenium condenses. In one region there exists a layer of gold selenide ($Au_2Se_3$) with excess gold, forming an n-type layer. In another region there exists a layer of intrinsic gold selenide ($Au_2Se_3$). In another region there exists a layer of gold selenide ($Au_2Se_3$) with excess selenium, forming a p-type layer. In another region there exists a layer of selenium doped with gold, forming a n-type layer. The overall semiconductor type structure of the composite layer is therefore metal-n-i-p-n, and the selenium surface layer is usually p-type. One effect of absorbed radiation on a structure of this type is a persistent change in the barrier height of one or more of the rectifying junctions, or a persistent polarisation of one or more of these junctions as may be seen from FIG. 4. Imagewise exposure to radiation therefore results in an imagewise variation in the quantity of charge retained during a subsequent charging operation, and this charge image can be rendered visible by suitable pigment suspension development.

In the system using a support of glass coated with bismuth, and having first bismuth telluride ($Bi_2Te_3$) and then selenium vacuum evaporated on to the support at room temperature, diffusion occurs at both the bismuth-bismuth telluride interface and the bismuth telluride-selenium interface. This is caused by localised temperature rise at the surface due to release of latent heat as the bismuth telluride and the selenium condense. (FIG. 2). In one region there exists a layer of bismuth telluride ($Bi_2Te_3$) with excess bismuth, which is n-type. In another region there exists a layer of bismuth telluride ($Bi_2Te_3$) doped with selenium, which is p-type. In another region there exists a layer of selenium doped with bismuth and tellurium which is n-type. The overall semiconductor type structure of the composite layer is therefore metal-n-p-n, irrespective of the semiconductor nature of the bismuth telluride and selenium used. Charges of either polarity applied to the surface of this structure will be blocked in their passage to the metal base layer by a reversed biased rectifying junction. High purity chemicals need not be used for the production of satisfactory systems such as this, and no dopants need be introduced into the chemicals used, although impurities may modify the performance of a specified system. It is obvious that the thickness of the various layers is not critical, since the appropriate n-type and p-type layers are formed in the diffusion regions, and their thickness is virtually independent of the amounts of substances deposited. The effect of absorbed radiation on a system of this type can be the production of electron-hole pairs which move according to potential gradients in such a manner as to discharge or neutralize any charges already present, or it can be a lowering of the barrier height of one or more of the rectifying junctions permitting movement of any charges present in such a manner that they are discharged or neutralized (FIG. 3). Both of these effects are usually rapid both in rise and decay, so that systems of this type may be used and re-used repeatedly without showing any memory effect. The spectral photosensitivity of this system is essentially the same as that of bismuth telluride ($Bi_2Te_3$), but bismuth telluride will not by itself support any significant amount of charge in the dark.

It should be noted that vacuum evaporation of any substance on to a solid metal support will not usually produce a heterojunction with sufficient diffusion unless the support is held at high temperature. Localized temperature rise at the surface is largely prevented by the rapid conduction of heat into the metal. However, if now another substance is vacuum evaporated on top of the first, diffusion at the new interface will occur with the support at a much lower temperature because the thermal barrier at the first interface prevents rapid heat conduction into the metal support.

FIGS. 1 and 2 also show that the actual rectifying junctions in a diffused heterojunction do not consist of uniform planes, but are typified by the inclusion of randomly distributed atoms of diffused elements. This in effect, gives the junction a rough surface, with hills and valleys corresponding to the distribution of diffused atoms. Charges blocked by such junctions will find their way into positions of minimum energy represented by the hills and valleys of the junction surface. It is this feature which prevents lateral drift of charge in diffused heterojunctions, as it is not easy for charges to migrate into neighbouring positions of minimum energy.

Thus FIG. 1 represents a diffused heterojunction featuring compound formation in the diffusion zone, typified by a gold-selenium junction. In this figure A represents selenium usually p-type, while B represents selenium doped with gold, n-type, and C is gold selenide doped with selenium, p-type. D represents gold selenide, intrinsic, and E gold selenide doped with gold, n-type. F is a gold, metallic conductor.

FIG. 2 represents a diffused heterojunction with no compound foormation in the diffusion zone, typified by a bismuth telluride-selenium junction. In this A is selenium, usually p-type, B is selenium doped with bismuth and tellurium, n-type, C is bismuth telluride doped with selenium, p-type and D is bismuth telluride, either n-type or p-type.

FIG. 3 represents a simple diffused heterojunction multilayer, showing the location of charges and the effect of irradiation. In this figure A represents a p-n junction, B an n-p junction and C represents photons. In 1. A positive charge has been applied to the top surface and in 2. A negative charge has been applied to the top surface.

FIG. 4 is a representation of another simple diffused heterojunction multilayer, showing a persistent effect due to irradiation. In this A represents an n-p junction B a p-i-n junction and C shows photons. D is a persistent resistive layer formed by irradiation.

In 1. No charge has been applied to the surface but a portion of the surface is being exposed to radiation, and in 2. The same multilayer is shown after exposure, with a negative charge applied to the top surface.

Suitable materials for the first coating may include antimony, arsenic, gold, copper, cadmium, bismuth, germanium, silicon, the carbides, nitrides and borides or uranium, tungsten and tantalum, the oxides, sulfides, selenides, tellurides and iodides of thallium, antimony, bismuth, cadmium, lead, mercury and copper, the arsenides and antimonides of copper, gallium and indium, and so on.

Suitable materials for the surface coating may include carbon, selenium the sulphides, selenides and sulfo selenides of antimony, arsenic and cadmium, the oxides of aluminum, nickel, titanium, tin, silicon and zinc, and so on.

The following specific examples of the present invention each illustrate one of the advantages claimed:

EXAMPLE 1.

In this example, the support is glass coated with bismuth by vacuum evaporation.

Further coatings of firstly bismuth telluride ($Bi_2Se_3$) and then selenium were applied by vacuum evaporation with the support at room temperature. The plate was then charged positively using a rotating table multipoint corona charger, exposed through a mask to the infra-red radiation from a moderately hot (about 150°C.) soldering iron, and developed in a negative electrophotographic developer. This produces a shadow picture, with the developer depositing in areas shielded from the radiation.

EXAMPLE 2.

The support of Example 1 was this time coated with firstly thallium selenide ($Tl_2Se_3$) and then selenium by vacuum evaporation with the support at room temperature. The plate was then charged as in Example 1, exposed imagewise to X-rays, and developed as in Example 1 to produce a positive radiograph.

EXAMPLE 3.

The support of Example 1 was this time coated with firstly bismuth selenide ($Bi_2Se_3$) and then arsenic trisulfide ($As_2S_3$) by vacuum evaporation with the support at room temperature. The plate was then charged negatively using a rotating table multipoint corona charger exposed imagewise to light, stored in the dark for 24 hours, and then developed in a positive electrophotographic developer. The positive image so produced shows no sign of deterioration during the storage period.

EXAMPLE 4.

In this example a glass support was coated with firstly gold and then selenium by vacuum evaporation with the support at room temperature. The plate was dark rested for several days, exposed imagewise to light, stored in the dark for 1 hour, charged as in Example 3, and then developed as in Example 3. The positive image produced is similar to an image obtained by charging prior to exposure and developing immediately.

EXAMPLE 5.

In this example, the aluminum support was coated with firstly molybdenum trioxide ($MoO_3$) and then magnesium fluoride ($MgF_2$) by vacuum evaporation with the support at room temperature. The plate was then exposed to the helium ion image in a filed ion microscope, and developed in negative electrophotographic developer, to produce a visible image in areas struck by ions.

From the foregoing it will be realized that the invention relates generally to a process for preparing electrostatic photographic systems with any desired long wavelength limit of spectral response, which comprises the application of a layer of a selected narrow band gap semiconductor on to a suitable support, followed by the application of a layer of selected photoconductor or insulator under conditions which ensure diffusion of portion of one layer into the other at the interface.

It will further be realized that the systems may have any desired spectral response characteristic, which can be obtained by the application of a series of layers of selected narrow band gap semiconductors on to a suitable support, followed by the application of a layer of selected photoconductor or insulator under conditions which ensure diffusion of portion of each layer into adjacent layers at the interfaces.

Further if the systems are to be sensitive to X-rays or gamma rays, the application of a layer of selected semiconductor with high photoelectric X-ray or gamma ray absorption may be effected on to a suitable support, followed by the application of a layer of selected photoconductor or insulator under conditions which ensured diffusion of a portion of one layer into the other at the interface.

In the case where prolonged retention of charge in the dark is required, a layer of selected semiconductor is applied to a suitable support, followed by the application of a layer of selected photoconductor or insulator under conditions which ensure diffusion of portion of one layer into the other at the interface, and which result in the production of one or more strongly p-type regions and one or more strongly n-type regions.

Where it is required that exposure to suitable radiation is to result in a persistent photo-effect the invention comprises the application of a layer of selected metal to a suitable support, followed by the application of a layer of selected photoconductor or insulator under conditions which ensure diffusion of portion of one layer into the other at the interfaces.

If, according to the invention, exposure to high energy charged particle radiation is to produce a corresponding persistent electrostatic image, a layer or layers of selected photoconductors or insulators are applied to a suitable conductive support under conditions which ensure diffusion of a portion of each material into the other at the interface.

What I claim is:

1. The method of coating surfaces for electrostatic photography which consists of successively depositing dissimilar materials on to a surface under conditions such that each material forms a layer which is polycrystalline or amorphous and partial diffusion of one material into the adjacent material to a depth of about 100 nanometers occurs at the interface between the dissimilar materials, said materials being chosen to combine chemically as one or more semiconductor compounds having zones of p-type and n-type material which act together as rectifying junctions.

2. The method of claim 1 wherein a polycrystalline or amorphous base is used which forms the first material, over which is deposited the second polycrystalline or amorphous material under conditions which cause partial diffusion to occur to a depth of about 100 nanometers at the coating-support interface in order to produce by chemical combination zones of p-type and n-type semiconductors in the diffused region.

3. The method of claim 1 wherein a base has successively deposited on it two polycrystalline or amorphous materials under conditions which cause partial diffusion of one material into the other to a depth of about 100 nanometers at the interface in order to produce by chemical combination the required zone of p-type and n-type semiconductors.

4. The method of claim 1 wherein a first material is a polycrystalline or amorphous conductor or semiconductor and a second adjoining material is a polycrystalline or amorphous photoconductor.

5. The method of claim 1 wherein a first material is a polycrystalline or amorphous conductor or semiconductor and a second adjacent material is an polycrystalline or amorphous insulator with some injected charge mobility.

6. The method of claim 1 wherein a base has successively deposited on it more than two polycrystalline or amorphous materials under conditions which cause partial diffusion of each material into the others to a depth of about 100 nanometers at the interfaces to produce by chemical combination the required zones of p-type and n-type semiconductors.

7. The method of claim 1 wherein the first deposited material is selected from antimony, arsenic, gold, copper, cadmium, bismuth, germanium, silicon, the carbides, nitrides and borides of uranium, tungsten and tantalum, the oxides, sulfides, selenides, tellurides, and iodides of thallium, antimony, bismuth cadmium, lead, mercury and copper, the arsenides and antimonides of copper, gallium and indium, and the second deposited material is selected from carbon, selenium, the sulfides, selenides and sulfo-selenides of antimony, arsenic and cadmium, the oxides of aluminum, nickel, titanium, tin, silicon and zinc.

* * * * *